Aug. 21, 1923.
B. M. W. HANSON
WHEEL TRUING MECHANISM
Filed Jan. 25, 1922
1,465,266
Fig. 1.
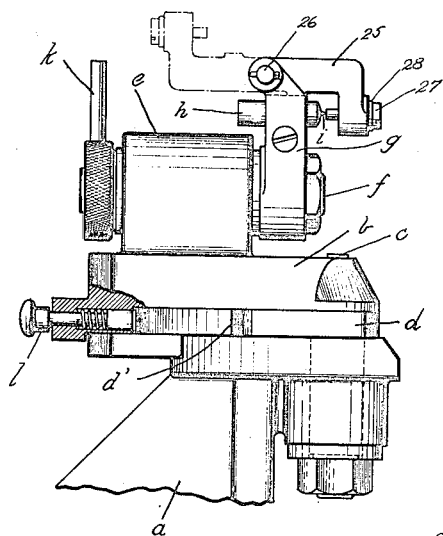
Fig. 4.
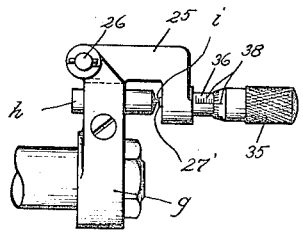
Fig. 5.
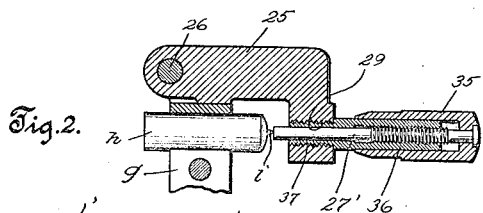
Fig. 2.
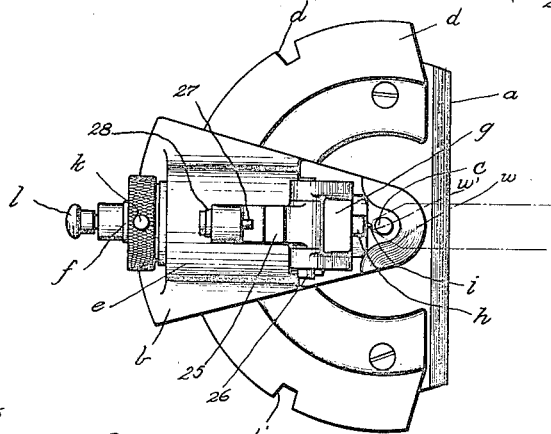
Fig. 3.
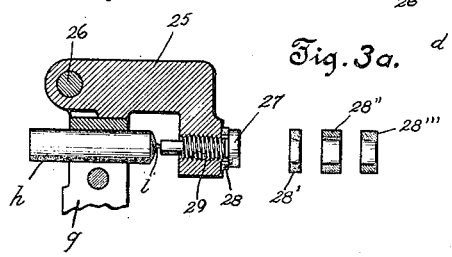
Fig. 3a.
Inventor
Bengt M. W. Hanson
By H. Clay Lindsey
His Attorney Patented Aug. 21, 1923.

1,465,266

UNITED STATES PATENT OFFICE.

BENGT M. W. HANSON, OF HARTFORD, CONNECTICUT.

WHEEL-TRUING MECHANISM.

Application filed January 25, 1922. Serial No. 531,642.

*To all whom it may concern:*

Be it known that I, BENGT M. W. HANSON, a citizen of the United States, and a resident of Hartford, county of Hartford, State of Connecticut, have invented certain new and useful Improvements in Wheel-Truing Mechanism, of which the following is a specification.

The present invention relates to a grinding wheel truing or shaping device of the general type illustrated and described in my co-pending application Serial No. 391,013, filed June 23rd, 1920, and has as its object to provide a device of this sort with means of a simple and effective nature for quickly and accurately adjusting or setting the cutting tool relative to the center about which it is indexed so that this tool will generate on the grinding wheel a cutting edge, the faces of which are in proper relation to each other, and this cutting edge will accurately conform in shape and size to the cut, for instance a thread, to be taken in the work.

In the accompanying drawing:

Fig. 1 is a side elevation of the truing device with parts in section;

Fig. 2 is a top plan view thereof, the gage being shown in inoperative position;

Fig. 3 is a sectional view taken through the gage, and

Fig. 3ª illustrates in cross section gage members of different sizes which may be interchangeably applied to determine the position of the gage screw.

Fig. 4 is a side elevation of a portion of the truing device, showing a modified form of gage.

Fig. 5 is a sectional view taken through the modified gage.

Referring to the drawing in detail, *a* denotes a suitable support of any desired construction, it being here shown as in the form of a bracket. *b*, denotes an indexible carriage pivoted on a vertical pin *c* upstanding from the bracket *a*, and *d* designates a segmental plate fixed to the top of the bracket *a* and over which the carriage is adapted to be moved in a horizontal plane. The carriage *b* is provided with a bearing *e* in which is journaled an operating shaft *f*, the axis of this shaft being at right angles to that of the vertical pin *c*. Secured, in any suitable manner, to the forward end of the shaft *f* is a tool carrying part *g* in which is mounted for longitudinal adjustment on a line parallel to the axis of the shaft *f* a tool holder *h*, the tool being shown for illustrative purposes as comprising a diamond point *i*. On the rear end of the shaft *f* is a handle *k* by means of which the shaft may be rocked to oscillate the diamond point across the face of the grinding wheel to be trued, the grinding wheel being shown in dotted lines and indicated by the letter W in Fig. 2.

It will be noted that by swinging the carriage *b* about the pivotal pin *c*, the diamond point may be brought into operative relation with either of the bevel faces *w* or the peripheral face *w'* of the grinding wheel, and for the purpose of holding the carriage in its indexed positions, suitably spaced notches *d'* are provided in the segmental plate, and the carriage is provided with a spring pressed plunger *l* adapted to engage in these notches. The position of the notches *d'* will, of course, vary in accordance with the angle of the thread to be cut. These notches will be angularly spaced at 60° about the pivot pin *c* as a center if the thread to be cut is in accordance with the United States standard.

It will be seen from the foregoing description that the diamond point is indexible about a fixed axis, namely, a line coincident with the axis of the pivot pin *c*, and the diamond point is adjustable in the tool carrying part *g* at right angles to this line about which it is indexible. After the diamond point is properly adjusted in the tool carrying part, which may be accomplished by the gage hereinafter described, the carriage may be indexed so that the diamond point will operate on one of the side faces of the wheel, then indexed to the other extreme position to resurface the other side or bevel face of the wheel, and then indexed to a mid or central position to operate upon the flat or truncated face of the wheel, the latter position being shown in Figs. 1 and 2. This all means that the side faces and the flat face of the grinding wheel will bear proper relation to each other.

For the purpose of properly adjusting the diamond point relative to the center about which it is indexed and thus make certain that the extent of the flat or peripheral face of the wheel shall be correct for any given pitch, I provide a gage which includes an arm 25 pivoted as at 26 to the tool carrying part *g*, and a screw 27 threaded for longitudinal adjustment in an opening 29 in the arm, as illustrated. When the arm is in operative position, as shown in Fig. 3 and in full lines Fig. 1, the tool holder h and the screw 27 are in axial alinement. After the diamond point has been adjusted by means of the gage, the latter may be thrown into inoperative position, as illustrated by dotted lines Fig. 1.

For the purpose of determining the proper longitudinal adjustment of the screw 27 in the arm 25 for any given pitch of thread, means of novel and advantageous nature are provided. This means, in the embodiment illustrated in Figs. 1, 2 and 3, comprises a plurality of spacing members of different sizes adapted to be interchangeably interpositioned between the head of the screw and the arm 25. These spacing members, in the present illustrative disclosure of the invention, are shown as being in the form of rings 28, 28', 28'', etc. These rings, as stated, vary in length in predetermined relation to each other. The length of these rings or gage members will correspond to the various pitches of threads to be cut. It will be seen that the diamond point, after it has once been adjusted, has a definite relation to the axis about which the carriage is indexed, and that the gage, since it is pivoted to the tool carrying part, has a definite relation to the diamond point. It, therefore, follows that by selecting a gage member 28 corresponding to the pitch of thread to be cut and interposing this gage member between the head of the screw and the gage arm, and screwing the plug home against this selected gage member, and then bringing the diamond point into engagement with the end of the screw, the diamond point must be properly adjusted relative to the fixed center about which it is indexed. The diamond point is now properly positioned to insure that the side faces and the flat will be properly shaped and sized and at the proper angular relation with respect to one another. It may be further stated that the center about which the diamond point is indexed lies in a plane passing through the center of the edge of the grinding wheel, and that the truing device and grinding wheel are adjustable one relative to the other in this plane.

In the embodiment of the invention illustrated in Figs. 4 and 5, the adjustment of the screw 27' is brought about by rotating a barrel 35 secured to the screw. The screw is carried by and has threaded engagement with a sleeve 36 having a threaded nipple 37 which is screwed into the threaded opening 29 in the gage arm. The barrel 35 rotatably surrounds this sleeve and the barrel and sleeve are provided with a micrometer scale 38, as illustrated in Fig. 4. It will be clear that this scale will accurately indicate the longitudinal position of adjustment of the screw 27'. After the screw is properly adjusted, the diamond point is brought into engagement with the end thereof as in the preceding embodiment.

What I claim is:—

1. In combination, a tool carrying part indexible about a fixed axis, a tool adjustable therein on a line intersecting said axis, a gage arm in definite relation to said tool carrying part but movable into and out of operative relation, a member mounted for adjustment in said gage arm and with which said tool is adapted to be brought into engagement, and means for determining the extent of adjustment of said member to correspond to a desired thread contour.

2. In combination, a tool carrying part indexible about a fixed axis, a tool adjustable therein on a line intersecting said axis, a gage arm in definite relation to said tool carrying part but movable into and out of operative position, a screw mounted for longitudinal adjustment in said arm and with the end of which said tool is adapted to be brought into engagement, and means for determining the extent of adjustment of said screw.

3. In combination, a tool carrying part indexible about a fixed axis, a tool adjustable therein on a line perpendicular to said axis, a gage arm in definite relation to said tool carrying part but movable into and out of operative relation, a member mounted for adjustment in said gage arm and with which said tool is adapted to be brought into engagement, and a plurality of interchangeable means for determining the extent of adjustment of said member.

4. In combination, a tool carrying part indexible about a fixed axis, a tool adjustable therein on a line intersecting said axis, a gage arm in definite relation to said tool carrying part, and a screw mounted for longitudinal adjustment in said gage arm and with which said tool is adapted to be brought into engagement, said arm having an abutment and said screw having a head between which any one of several gage members of different lengths are adapted to be positioned.

5. In combination with a rotatable grinding wheel having beveled faces and a flat peripheral face therebetween, a truing device having a tool carrying part indexible about a fixed axis, and a tool longitudinally adjustable therein to and from said axis, means for indexing and holding said tool carrying part with the tool carried thereby in contact with and at right angles to each of said faces, means for moving said tool carrying part back and forth in each indexed position, and a gage arm pivoted to said tool carrying part and adapted to be moved into an out of operative position, a screw mounted for longitudinal adjustment in said gage arm, and means for determining the extent of adjustment of said screw to correspond to a desired thread contour.

6. In combination, a carriage indexible about a fixed axis, a shaft on said carriage at right angles to said axis, a tool carrying part fixed on said shaft, a tool adjustable in said part on a line parallel to the axis of said shaft, means for oscillating said shaft, means for holding said carriage in indexed positions, a gage arm pivoted on said tool carrying part, and a screw adjustably mounted in said gage arm, said arm having an abutment and said screw having a head between which any one of several gage members of different lengths are adapted to be positioned.

BENGT M. W. HANSON.